(12) United States Patent
Ciparro et al.

(10) Patent No.: US 12,104,286 B2
(45) Date of Patent: Oct. 1, 2024

(54) METHODS OF FORMING A NANOCOMPOSITE FIBER AND RELATED MIXTURE AND NANOCOMPOSITE FIBERS

(71) Applicants: Nicholas L. Ciparro, Knoxville, TN (US); Bowie J. Benson, Knoxville, TN (US); Jedidiah L. Long, Clinton, TN (US); Austin X. Staub, Knoxville, TN (US)

(72) Inventors: Nicholas L. Ciparro, Knoxville, TN (US); Bowie J. Benson, Knoxville, TN (US); Jedidiah L. Long, Clinton, TN (US); Austin X. Staub, Knoxville, TN (US)

( * ) Notice: Subject to any disclaimer, the term of this patent is extended or adjusted under 35 U.S.C. 154(b) by 475 days.

(21) Appl. No.: 17/354,914

(22) Filed: Jun. 22, 2021

(65) Prior Publication Data

US 2022/0074078 A1 Mar. 10, 2022

Related U.S. Application Data

(60) Provisional application No. 63/043,850, filed on Jun. 25, 2020.

(51) Int. Cl.
| | |
|---|---|
| *D01F 6/04* | (2006.01) |
| *B82Y 30/00* | (2011.01) |
| *B82Y 40/00* | (2011.01) |
| *C08K 3/04* | (2006.01) |
| *C08L 23/06* | (2006.01) |

(52) U.S. Cl.
CPC ............... *D01F 6/04* (2013.01); *C08K 3/042* (2017.05); *C08L 23/06* (2013.01); *B82Y 30/00* (2013.01); *B82Y 40/00* (2013.01); *C08L 2207/068* (2013.01); *D10B 2321/0211* (2013.01)

(58) Field of Classification Search
None
See application file for complete search history.

(56) References Cited

U.S. PATENT DOCUMENTS

| | | | |
|---|---|---|---|
| 5,068,073 A | 11/1991 | Pennings et al. | |
| 2010/0190931 A1 | 7/2010 | Kristen et al. | |
| 2010/0286314 A1* | 11/2010 | Chu .................... | C08K 3/04 524/99 |

(Continued)

FOREIGN PATENT DOCUMENTS

| | | |
|---|---|---|
| CN | 104762683 A | 7/2015 |
| NL | 7904990 A | 12/1980 |

OTHER PUBLICATIONS

International Search Report for International Application No. PCT/US21/38527, mailed Oct. 15, 2021, 2 pages.

(Continued)

*Primary Examiner* — Jeffrey D Washville
(74) *Attorney, Agent, or Firm* — Chambliss, Bahner & Stophel, P.C.; Stephen D. Adams

(57) ABSTRACT

A method of preparing a nanocomposite fiber comprising suspending carbon powder comprising graphene flakes in a carrier fluid. A solid polymer material is added to the carrier fluid having the carbon powder suspended therein to create a mixture. The mixture is heated and the solid polymer material is at least partially dissolved within the carrier fluid having the carbon powder suspended therein. The carrier fluid is removed from the mixture, forming the polymer into a fiber carrying the graphene flakes.

20 Claims, 6 Drawing Sheets

(56) References Cited

U.S. PATENT DOCUMENTS

| 2014/0004344 A1 | 1/2014 | Kim et al. |
| 2015/0267030 A1 | 9/2015 | Nosker et al. |
| 2017/0107643 A1* | 4/2017 | Chou .................... C01B 32/192 |
| 2018/0080148 A1* | 3/2018 | Westerhoff ........... B01J 20/0233 |
| 2020/0139665 A1 | 5/2020 | Berrang |
| 2020/0247974 A1* | 8/2020 | Gao ......................... D01F 1/09 |
| 2023/0012274 A1* | 1/2023 | Tran ..................... C09D 11/037 |

OTHER PUBLICATIONS

International Written Opinion for International Application No. PCT/US21/38527, mailed Oct. 15, 2021, 4 pages.

Pennings et al., High-speed gel-spinning of ultra-high molecular weight polyethylene, Jun. 22, 2021, Polymer Bulletin, 167-174, 16.

\* cited by examiner

METHODS OF FORMING A NANOCOMPOSITE FIBER AND RELATED MIXTURE AND NANOCOMPOSITE FIBERS

PRIORITY CLAIM

This application claims the benefit under 35 U.S.C. § 119(e) of U.S. Provisional Patent Application Ser. No. 63/043,850, filed Jun. 25, 2020, the disclosure of which is hereby incorporated herein in its entirety by this reference.

TECHNICAL FIELD

Embodiments of the disclosure relate to nanocomposite fibers, mixtures for preparing nanocomposite fibers, methods of forming nanocomposite fibers and applications thereof.

BACKGROUND

In modern conflicts, soldiers are often equipped with bullet resistant garments and associated garment inserts that provide protection from projectiles. With increasing threat levels due to improved availability and development of projectiles with enhanced lethality and penetration severity, ballistic protection must advance accordingly.

Ballistic protection for personnel may include a multi-part system that may be composed of a strike face and a backing plate and may include encapsulating layer. Strike faces may be comprised of hard ceramic plates or tiled ceramic arrangements that can be materials such as alumina (Al2O3), silicon carbide (SiC), boron carbide (B4C), silicon nitride (Si3N4), boron suboxide (B6O), titanium diboride (TiB2), as well as various other nanocomposites and mixtures thereof. Of these materials, the most common are alumina, silicon carbide, and boron carbide. This hard-ceramic plate or tiled arrangement is used to disintegrate and ablate the projectile before it reaches the projectile capturing backing plate.

The backing plate functions to capture the penetrator as well as any accelerated strike face fragments and may be composed of any layered combination of reinforced or unreinforced polymeric materials as well as non-woven, woven, and/or unidirectional textiles. Examples include glass fibers, aramid fibers, or ultra-high molecular weight polyethylene ("UHMWPE"). UHMWPE is a type of polyolefin characterized by having extraordinarily long molecular chains with a molecular weight of one million or greater, usually between 3.5 and 7.5 million amu. As a result, UHMWPE exhibits enhanced mechanical properties than that of conventional polyethylene, making it a preferred choice for engineering applications.

Graphene is definitively a monoatomic, 2-dimensional material composed of pure carbon arranged in a hexagonal pattern. The addition of small amounts of graphene into a material may greatly improve its mechanical, electrical, thermal, diffusive, and environmental properties. Manufacturing of nanocomposites including graphene continues to be very difficult, and many nanocomposites suffer inadequate dispersion/distribution of reinforcement in the matrix. Furthermore, the incorporation of graphene into UHMWPE has yet to be done in such a way to produce commercially viable nanocomposite fibers with a homogeneous dispersion/distribution of graphene with superior properties.

BRIEF SUMMARY

Embodiments described herein include nanocomposite fibers, mixtures for preparing a nanocomposite fiber and methods of forming the nanocomposite fibers. For example, in accordance with one embodiment described herein, a nanocomposite fiber comprises an ultra-high molecular weight polyethylene polymer matrix comprising amorphous regions and crystalline regions and graphene flakes. The graphene flakes are dispersed in and carried by the polymer matrix without any covalent atomic bonds between the graphene flakes and the polymer matrix.

In additional embodiments, a mixture for preparing the nanocomposite fiber comprises carbon powder including graphene flakes, a carrier fluid, and ultra-high molecular weight polyethylene.

In additional embodiments, a method for forming the nanocomposite fiber comprises suspending carbon powder including graphene flakes in a carrier fluid. Adding a solid polymer material to the carrier fluid having the carbon powder suspended therein to create a mixture. Heating the mixture and at least partially dissolving the solid polymer material within the carrier fluid having the suspended carbon powder. Removing the carrier fluid from the mixture and forming the polymer into a fiber carrying the graphene flakes.

DETAILED DESCRIPTION

Figure 1:
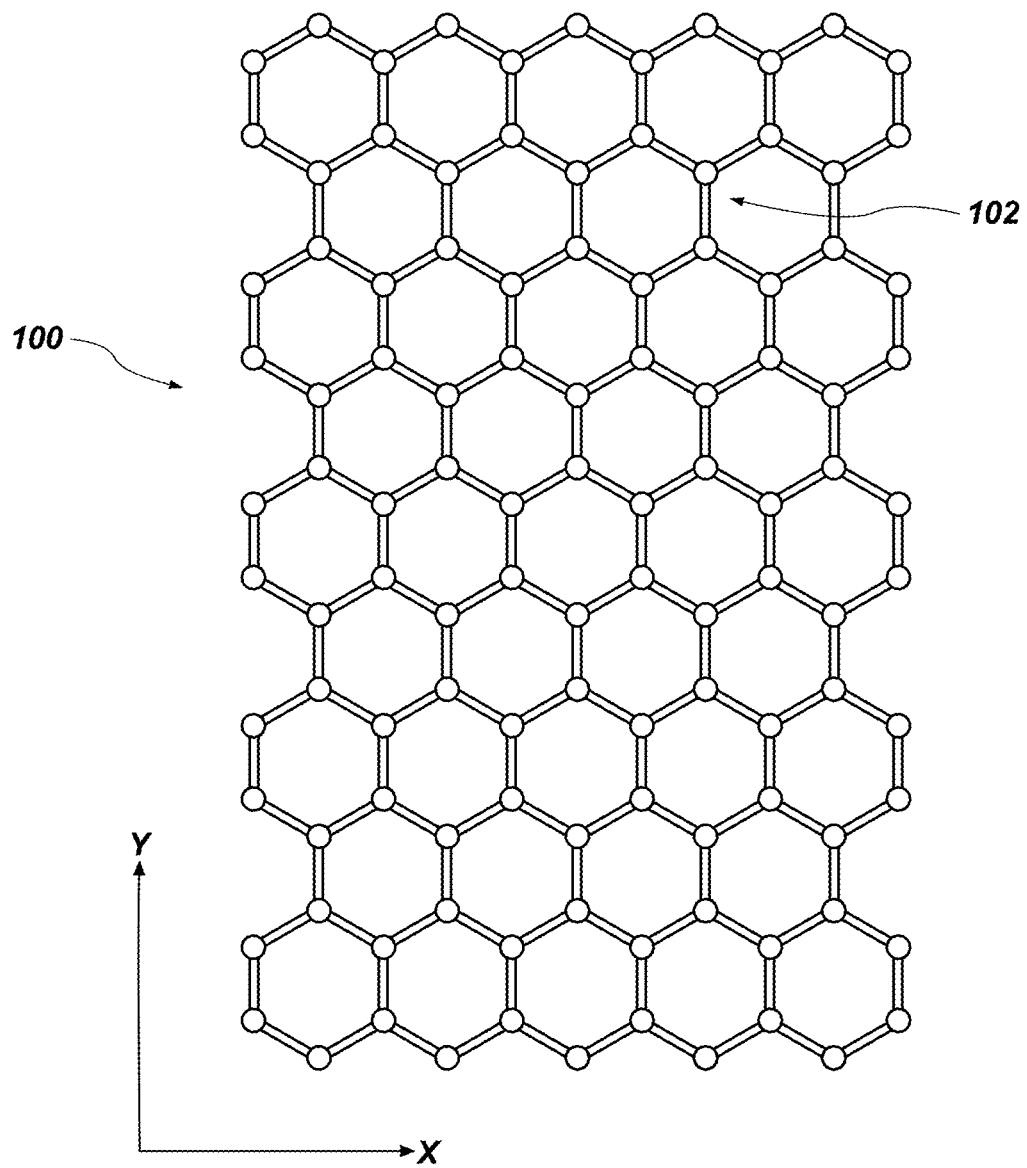
FIG. 1 is an illustration of the molecular structure of graphene.

The following description provides specific details, such as specific shapes, specific sizes, specific material compositions, and specific processing conditions, in order to provide a thorough description of embodiments of the present disclosure. However, a person of ordinary skill in the art would understand that the embodiments of the disclosure may be practiced without necessarily employing these specific details. Embodiments of the disclosure may be practiced in conjunction with conventional fabrication techniques employed in the industry. In addition, the description provided below does not form a complete process flow for manufacturing a nanocomposite fiber. Only those process acts and structures necessary to understand the embodiments of the disclosure are described in detail below. Additional acts to form a complete nanocomposite fiber from the structures described herein may be performed by conventional fabrication processes.

Drawings presented herein are for illustrative purposes only, and are not meant to be actual views of any particular material, component, structure, device, or system. Variations from the shapes depicted in the drawings as a result, for example, of manufacturing techniques and/or tolerances, are to be expected. Thus, embodiments described herein are not to be construed as being limited to the particular shapes or regions as illustrated, but include deviations in shapes that result, for example, from manufacturing. For example, a region illustrated or described as box-shaped may have rough and/or nonlinear features, and a region illustrated or described as round may include some rough and/or linear features. Moreover, sharp angles that are illustrated may be rounded, and vice versa. Thus, the regions illustrated in the figures are schematic in nature, and their shapes are not intended to illustrate the precise shape of a region and do not limit the scope of the present claims. The drawings are not necessarily to scale. Additionally, elements common between figures may retain the same numerical designation.

As used herein, the singular forms of the terms "a," "an," and "the" are intended to include the plural forms as well, unless the context clearly indicates otherwise.

As used herein, "about" or "approximately" in reference to a numerical value for a particular parameter is inclusive of the numerical value and a degree of variance from the numerical value that one of ordinary skill in the art would understand is within acceptable tolerances for the particular parameter. For example, "about" or "approximately" in reference to a numerical value may include additional numerical values within a range of from 90.0 percent to 210.0 percent of the numerical value, such as within a range of from 95.0 percent to 105.0 percent of the numerical value, within a range of from 97.5 percent to 202.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures. For example, if materials in the figures are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, etc.) and the spatially relative descriptors used herein interpreted accordingly.

As used herein, reference to an element as being "on" or "over" another element means and includes the element being directly on top of, adjacent to (e.g., laterally adjacent to, vertically adjacent to), underneath, or in direct contact with the other element. It also includes the element being indirectly on top of, adjacent to (e.g., laterally adjacent to, vertically adjacent to), underneath, or near the other element, with other elements present therebetween. In contrast, when an element is referred to as being "directly on" or "directly adjacent to" another element, no intervening elements are present.

A nanocomposite fiber (e.g., an ultra-high molecular weight polyethylene/graphene nanocomposite fiber) is disclosed. The nanocomposite fiber is produced by suspending carbon powder containing graphene flakes in a carrier fluid and adding a solid polymer material (e.g., ultra-high molecular weight polyethylene) by applying heat to create a polymer mixture (e.g., a mixture, a fluid polymer mixture). The nanocomposite fiber is formed by removing the carrier fluid from the mixture and forming (e.g., extruding) the polymer into a fiber (e.g., fiber-like form) carrying the graphene flakes. The graphene-containing nanocomposite fiber may exhibit improved mechanical performance compared to a conventional fiber.

FIG. 1 shows the molecular structure of graphene 100, including carbon atoms 102. Each carbon atom 102 is covalently bonded to three other carbon atoms 102 to form a honeycomb structure of graphene 100. The graphene 100 of FIG. 1 represents pristine monolayer graphene. To form the nanocomposite fiber carrying the graphene flakes, a carbon powder containing graphene flakes is suspended in a carrier fluid (e.g., paraffin oil, decalin, tetralin, kerosene, or other solvent). In some embodiments, the carbon powder may consist essentially of graphene flakes. The graphene flakes of the carbon powder comprise pristine monolayer graphene, and/or a few layers of graphene. The graphene 100 of the graphene flakes may not be functionalized in any way. In some embodiments, the carbon powder may further include graphene-based materials including surface modified graphene, reduced graphene oxide, graphene oxide or a combination thereof. The shape of graphene-based materials may be planar (e.g., paper-like form, flat). The shape of the graphene-based materials may be long and thin (e.g., a ribbon-like geometry). The thickness of the graphene flakes may be within a range from about 0.34 nm to about 5 nm, or from about 0.5 nm to about 2 nm. The graphene flakes of the carbon powder may be pristine monolayer graphene having a single layer of graphene, or a thickness of one carbon atom, or the graphene flakes are a few layers of graphene comprising two to ten layers, or a thickness of two to ten carbon atoms. The graphene flakes may have a diameter within a range of from about 500 nm to about $10^5$ nm (100 μm).

Figure 2:
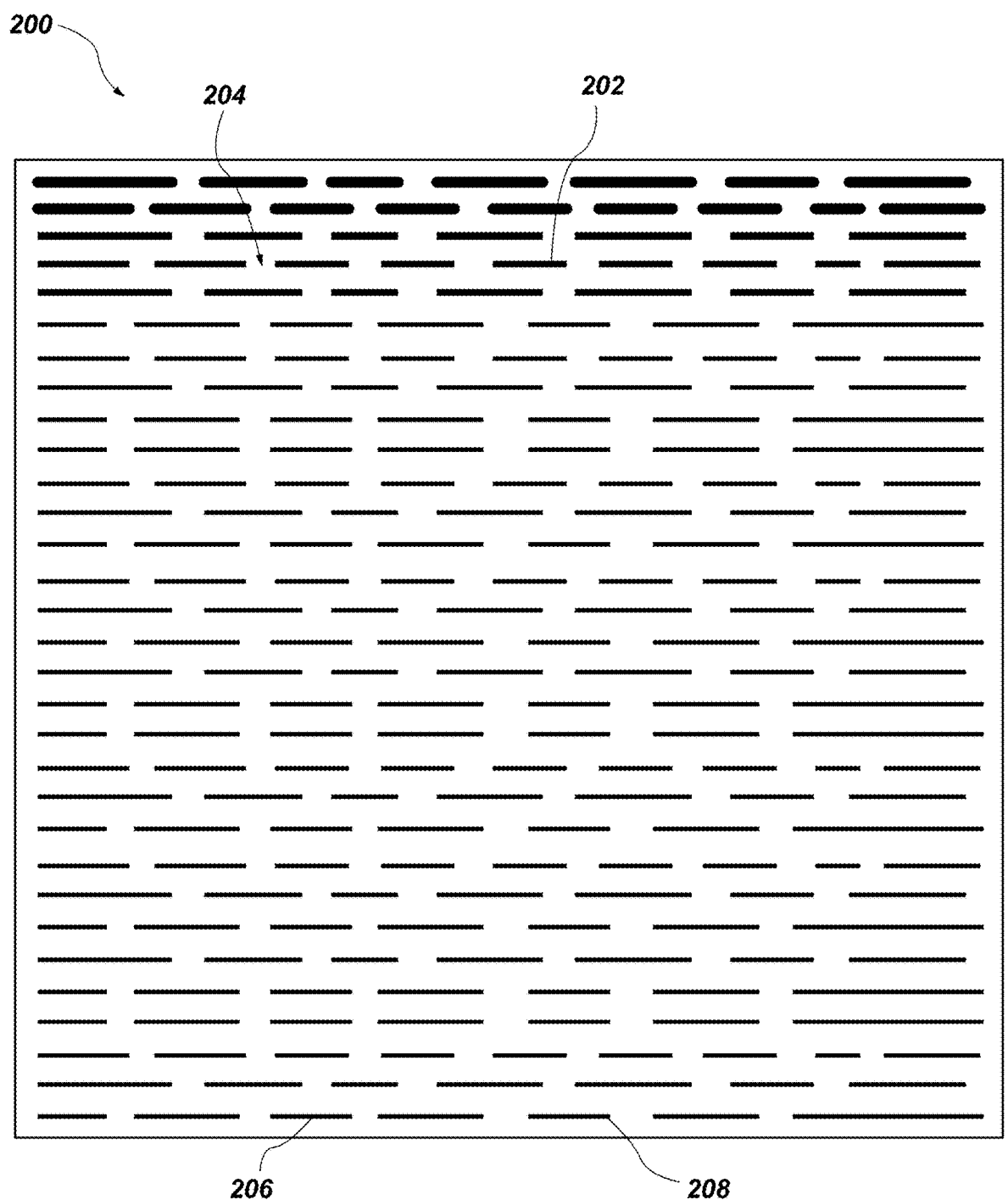
FIG. 2 is a schematic of graphene flakes in a carrier fluid used to form a nanocomposite fiber according to embodiments of the disclosure.

To suspend the graphene flakes in the carrier fluid and uniformly disperse (e.g., distribute) the flakes, a mixing act may be performed. FIG. 2 shows the homogeneous suspension 200 including graphene flakes 202 suspended in a carrier fluid 204 (e.g., paraffin oil, decalin, tetralin, kerosene, or other solvent). The carrier fluid 204 may be provided first, followed by the addition of the graphene flakes 202 to the carrier fluid 204. The mixing of the carrier fluid 204 and the carbon powder including graphene flakes forms the homogeneous suspension 200. The mixing act may further include ultrasonic mixing, shear mixing, or a combination thereof. In some embodiments, the frequency of the sonication may be within a range of from about 1 hertz (Hz) to about 50,000 Hz, from about 3 Hz to about 10,000 Hz, or from about 25 Hz to about 60 Hz. In some embodiments, the power may be within a range of from about 0.1 watts (W) to about 400 W per liter of carrier fluid 204, from about 50 W to about 400 W per liter of carrier fluid 204, or from about 180 W to about 400 W per liter of carrier fluid 204.

Dispersants 206 may be added to the carrier fluid 204 containing graphene flakes 202 to promote uniform dispersion of the graphene flakes 202 within the carrier fluid 204. The dispersants 206 may be, for example, a poly-etheramide, a polyacrylic acid, a coupling agent, a non-ionic surface active agent, or a combination thereof. If, for example, a coupling agent is added to the carrier fluid 204 containing graphene flakes 202, the carrier fluid 204 containing graphene flakes 202 and the coupling agent may be mixed with ultrasonic mixing and/or shear mixing.

Additionally, a coupling treatment (e.g., a reflux treatment) may be performed to promote uniform dispersion and adequate intercalation of the graphene flakes 202 in the carrier fluid 204. If, for example a reflux treatment is performed, the carrier fluid 204 containing the graphene flakes 202 and a silane coupling agent 208 is heated for a specific amount of time, while vapors are continuously cooled by using a condenser and returned to liquid form. The silane coupling agent 208 may be, but is not limited to, a coupling agent selected from among the triethoxysilanes, with a concentration of the silane coupling agent 208 in the carrier fluid 204 within a range of from about 1 gram to about 4 grams per 100 milliliters of carrier fluid 204.

Figure 3:
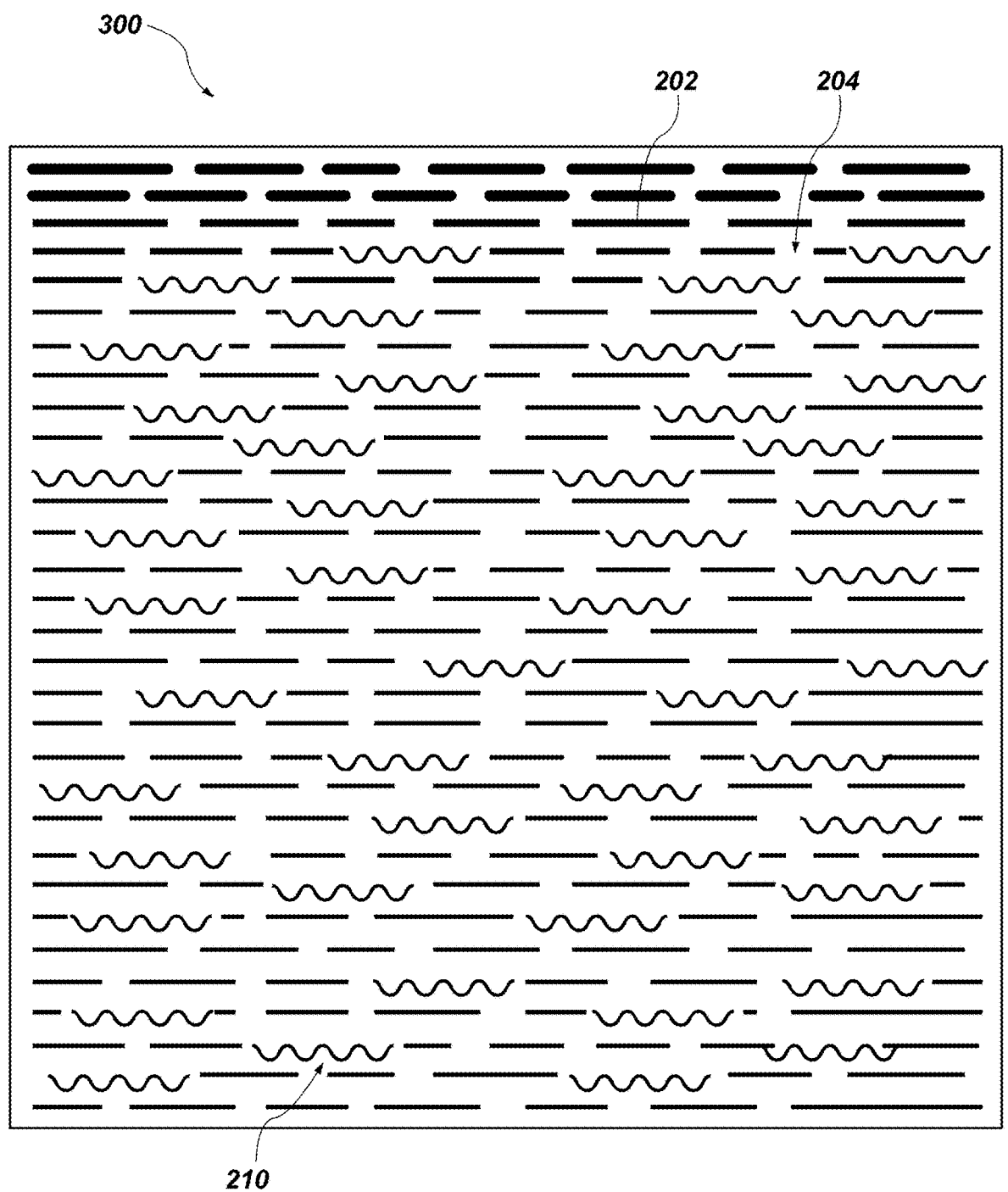
FIG. 3 is a schematic of a mixture of graphene flakes, carrier fluid and solid polymer used to form a nanocomposite fiber according to embodiments of the disclosure.

After suspending carbon powder containing graphene flakes 202 in a carrier fluid 204, a solid polymer material 210 may be added to form a polymer mixture 300 (e.g., a mixture, a fluid polymer mixture) as illustrated in FIG. 3. The solid polymer material 210 may be, but is not limited to, ultra-high molecular weight polyethylene (UHMWPE). If, for example, the solid polymer material 210 is UHMWPE, the average molecular weight is within a range of from about 3.5 million amu to about 7.5 million amu. Preparing the polymer mixture 300 may include adding the solid polymer material 210, UHMWPE, to the carrier fluid 204 containing graphene flakes 202 in a heated shear mixer (e.g., mixing kettle) to be processed into a polymer mixture 300. The amount of solid polymer material 210, UHMWPE, added to the carrier fluid 204 containing graphene flakes 202 is within a range of from about 1% to about 20% by volume of the polymer mixture 300. The polymer mixture 300 may be processed at a temperature within a range of from about 100° C. to about 300° C., or within a range of from about 100° C. to about 200° C., to at least partially dissolve the solid polymer material 210 within the polymer mixture 300. The time for the solid polymer material 210 to at least partially dissolve within the polymer mixture 300 may be less than or equal to 10 hours. Conditions for processing the polymer mixture 300, such as temperature, atmosphere and mixing time, may be selected to achieve the desired amount of dispersion (e.g., distribution) of the solid polymer material 210 within the carrier fluid 204 containing graphene flakes 202. For example, homopolymerization of the polymer mixture 300 may be performed in a nitrogen atmosphere. A temperature at which the polymer mixture 300 decomposes (e.g., a heat decomposition temperature, a thermal decomposition temperature) may be within a range of from about 370° C. to about 400° C.

Figure 4:
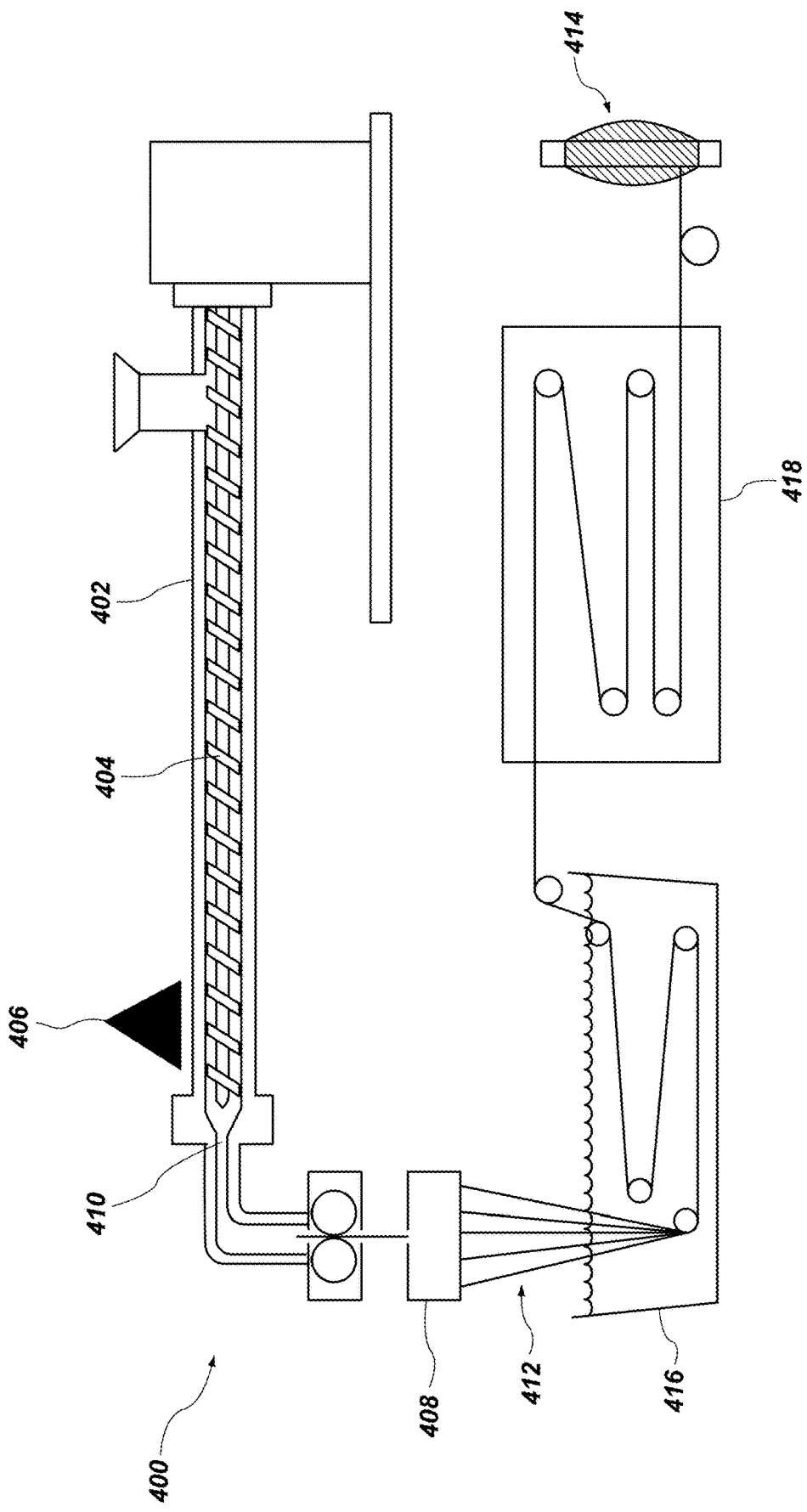
FIG. 4 is a schematic of an extrusion process used to form a nanocomposite fiber according to embodiments of the disclosure.

In accordance with embodiments of the disclosure, a method for forming a fiber (e.g., nanocomposite fiber, tow fiber) is disclosed. The method of forming may include an extrusion system as shown in FIG. 4 and is described in detail. Following the formation of the polymer mixture 300 containing carbon powder suspended in a carrier fluid 204, the polymer mixture 300 is subjected to an extrusion process (e.g., a co-rotating twin screw extrusion process). Referring to FIG. 4, an extrusion system used for the extrusion process 400 may include, but is not limited to, barrel 402, a screw (e.g., twin screws) 404, vacuum 406, and spinneret 408. The extrusion process 400 may include more than one barrel 402, more than one vacuum 406, and more than one spinneret 408. By way of non-limiting example, the extrusion system may be a conventional system that is commercially available, such as but not limited to, a Coperion Keya extruder model number HK 125.

By way of non-limiting example, the polymer mixture 300 is introduced into the barrel 402 of the extrusion system containing twin screws 404 which rotate at the same rate or in conjunction with each other. As the twin screws 404 rotate, the polymer mixture 300 is subsequently mixed as the polymer mixture 300 is pushed down the barrel 402 by the rotating motion of the twin screws 404. The polymer chains of the solid polymer are detangled and begin to align themselves as the polymer mixture 300 moves through the barrel 402. The carrier fluid 204 is removed from the polymer mixture 300 by employing a vacuum 406 at a location along the barrel 402 of the extrusion system. As the polymer mixture 300 passes through the area of the barrel 402 where the vacuum 406 is employed, the carrier fluid 204 is extracted from the polymer mixture 300 and removed from the extrusion system. The carrier fluid 204 extracted from the extrusion system may be recirculated and reused in the extrusion process 400. The resulting mixture containing the solid polymer material 210 and carbon powder containing graphene flakes 202 forms a homogeneous fluid at the end of the barrel 410. The homogeneous fluid exits the end of the barrel 410 and is pushed through a spinneret 408 (e.g., a metal nozzle) to form an extrudate 412 of nanocomposite material. The spinneret 408 utilized to form the extrudate 412 may have hundreds of openings. The diameter of each opening of the spinneret 408 may be from about 40 μm to about 150 μm. The extrudate 412 is comprised of a group of strands of the homogeneous fluid. The strands may be separate or may be wrapped together. Each strand of the extrudate 412 may have a diameter from about 500 nm to about 100 μm.

After formation of the extrudate 412, the extrusion process 400 may include an optional quenching process 416, in addition to an optional thermal process 418. The quenching process 416 may be performed in air and/or other liquid, such as water or oil. FIG. 4 shows a liquid quenching/extraction bath to perform the quenching process 416, and an oven to perform the thermal process 418. The quenching process 416 and the thermal process 418 may be performed in any order to produce the desired results. The quenching process 416 and/or the thermal process 418 may be repeated as necessary. The method described herein forms a nanocomposite fiber (e.g., fiber, tow fiber) 414. The extrudate 412 and the nanocomposite fiber (e.g., fiber, tow fiber) 414 may be coated with a material, such as an anti-static spin finish to provide enhanced processability, or may be compatibilized to promote better adhesion during subsequent processing acts.

Conventional manufacturing techniques are utilized to convert the resulting nanocomposite fiber into a tow fiber containing graphene flakes dispersed in a polymer matrix (e.g., an UHMWPE matrix). By way of non-limiting example, an UHMWPE matrix of the nanocomposite fiber is characterized as semi-crystalline comprising an amorphous region and a crystalline region. When the graphene flakes are properly dispersed in the mixture as described above, intercalation of the graphene flakes within the amorphous regions of the semi-crystalline UHMWPE matrix occurs, thus reinforcing the matrix to emulate the mechanical properties of a higher crystalline-percentage material or a higher molecular weight polymer. The graphene flakes are dispersed in and carried by the polymer matrix without any covalent atomic bonds between the graphene flakes and the polymer matrix. Additional processing of the fiber may be performed on the nanocomposite fiber in accordance with conventional techniques to continue to orientate the graphene flakes and polymer chains of the solid polymer material within the semi-crystalline UHMWPE matrix. Referring to FIG. 1, the orientation of the graphene flakes may generally be such that the x-axis of the graphene flake 100 is perpendicular to the cross-section of the fiber. The nanocomposite fibers according to embodiments of the disclosure may have a tensile strength within a range of from about 1.8 GPa to about 9.0 GPa, and a tensile modulus within a range of from about 90 GPa to about 600 GPa.

Figure 5:
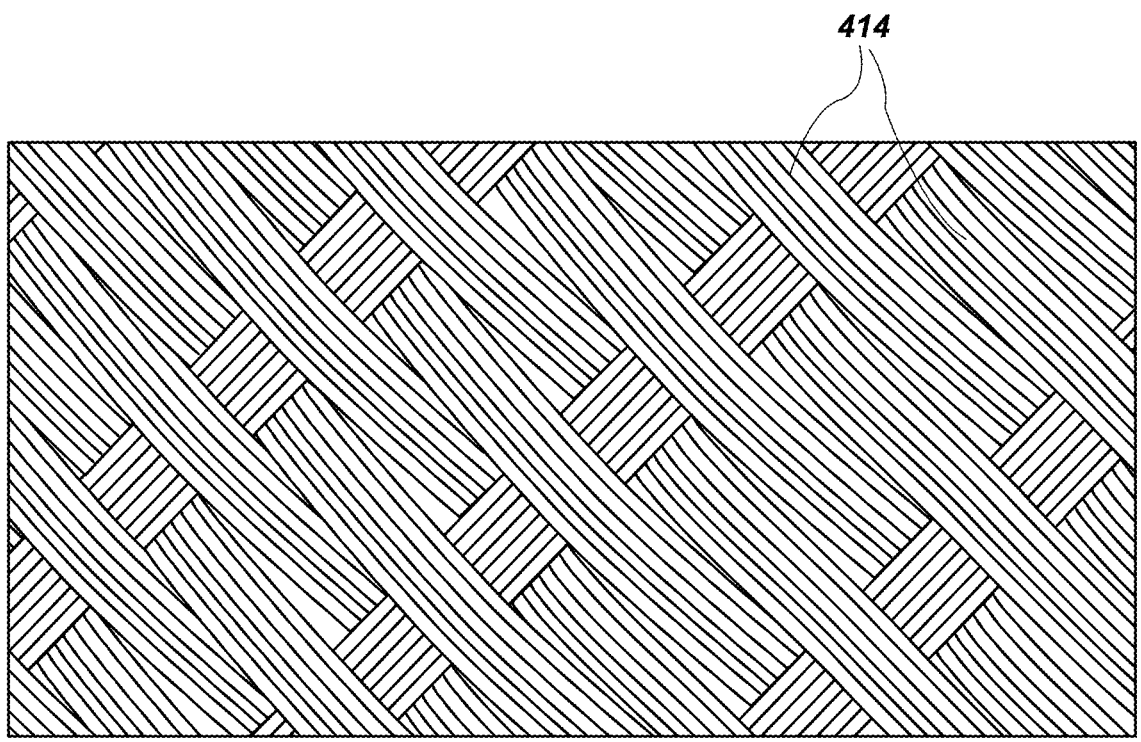
FIG. 5 is an example of a nanocomposite fabric composed from the nanocomposite fiber carrying the graphene flakes according to embodiments of the disclosure.
Figure 6:
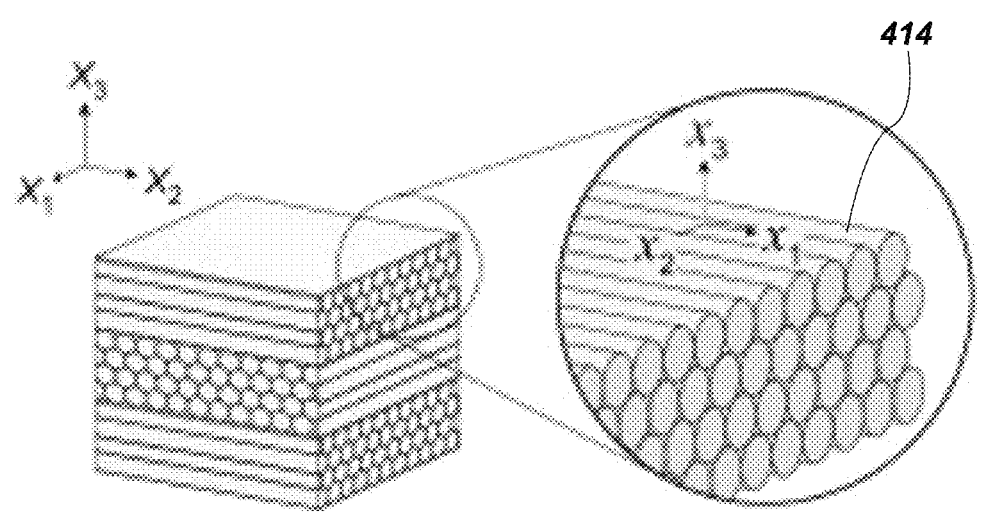
FIG. 6 is a simplified view of a unidirectional fabric including a nanocomposite fiber according to embodiments of the disclosure.

The nanocomposite fibers according to embodiments of the disclosure advantageously facilitate improvements to one or more of the following: tensile strength, impact absorption, cut and abrasion protection, fatigue resistance, and fracture strain compared to conventional fibers. The methods of forming the nanocomposite fibers according to embodiments of the disclosure facilitate the formation of textiles (e.g., fabrics), yarns, braided ropes, and cords used to produce ballistic materials (e.g., ballistic materials) having one or more of improved performance, reliability, durability, impact absorption, and improved strength as compared to conventional ballistic materials. FIGS. 5 and 6 show different structures of the lamination of nanocomposite fibers to form a fabric. FIG. 5 shows a woven fabric comprising a nanocomposite fiber, similar to the nanocomposite fiber 414 of FIG. 4 produced by methods of the disclosure. While, FIG. 6 shows a unidirectional fabric including a nanocomposite fiber, similar to the nanocomposite fiber 414 of FIG. 4 produced by methods of the disclosure. By way of non-limiting example, the unidirectional fabric may be formed of unidirectional layers of fibers that are stacked in a 0 degree (e.g., parallel to the $X_2$ axis)/90 degree (e.g., parallel to the $X_1$ axis) arrangement as shown in FIG. 6.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of the disclosure.

What is claimed is:

1. A method of forming a nanocomposite fiber, comprising:
    suspending carbon powder comprising pristine graphene flakes in a carrier fluid;
    adding a solid polymer material to the carrier fluid having the carbon powder suspended therein to create a mixture;
    heating the mixture and at least partially dissolving the solid polymer material within the carrier fluid having the carbon powder suspended therein; and
    removing the carrier fluid from the mixture and forming a polymer into a fiber carrying the graphene flakes.

2. The method of claim 1, further comprising continuously mixing the mixture with a screw, wherein the screw pushes the mixture through a barrel.

3. The method of claim 2, wherein forming the fiber comprises extruding the polymer through a metal nozzle connected to an end of the barrel, the metal nozzle having holes through which the polymer is extruded.

4. The method of claim 1, wherein heating the mixture and at least partially dissolving the solid polymer material within the carrier fluid having the carbon powder suspended therein comprises heating the mixture to a temperature within a range of from about 100° C. to about 300° C.

5. The method of claim 1, wherein heating the mixture and at least partially dissolving the solid polymer material within the carrier fluid having the carbon powder suspended therein comprises heating the mixture for less than or equal to 10 hours.

6. The method of claim 1, wherein suspending carbon powder in a carrier fluid comprises mixing the carrier fluid and the carbon powder to form a homogeneous suspension.

7. The method of claim 6, wherein homogenizing the carrier fluid and the carbon powder to form a homogeneous suspension comprises agitating the carrier fluid and the carbon powder at a frequency within a range of from about 1 Hz to about 50,000 Hz.

8. The method of claim 6, wherein homogenizing the carrier fluid and the carbon powder to form a homogeneous suspension comprises adding a dispersant to the homogeneous suspension.

9. The method of claim 6, wherein homogenizing the carrier fluid and the carbon powder to form a homogeneous suspension comprises adding a silane coupling agent to the homogeneous suspension.

10. The method of claim 1, wherein adding a solid polymer material further comprises adding a concentration of solid polymer material within a range of from about 1% to about 20% by volume to the mixture.

11. The method of claim 3, wherein extruding the polymer through a metal nozzle connected to the end of the barrel further comprises forming an extrudate comprising strands, wherein each strand has a diameter within a range of from about 500 nm to about 100 μm.

12. The method of claim 1, further comprising forming a fabric comprising the fiber carrying the graphene flakes.

13. A mixture for preparing a nanocomposite fiber, the mixture comprising:
    carbon powder comprising pristine graphene flakes;
    a carrier fluid; and
    ultra-high molecular weight polyethylene.

14. The mixture of claim 13, wherein the graphene flakes have a diameter within a range of from about 500 nm to about 100 μm.

15. The mixture of claim 13, wherein an amount of graphene powder in the mixture is within a range of from about 0.01% to about 10% by weight.

16. The mixture of claim 13, wherein the carrier fluid comprises paraffin oil, decalin, tetralin, or kerosene.

17. The mixture of claim 13, wherein the graphene flakes constitute at least 65% by weight of the carbon powder.

18. A nanocomposite fiber, comprising:
    an ultra-high molecular weight polyethylene polymer matrix comprising amorphous regions and crystalline regions; and
    pristine graphene flakes dispersed in and carried by the ultra-high molecular weight polyethylene polymer matrix without any covalent atomic bonds between the graphene flakes and the ultra-high molecular weight polyethylene polymer matrix.

19. The nanocomposite fiber of claim 18, wherein an amount of graphene flakes located in the amorphous regions of the ultra-high molecular weight polyethylene polymer matrix is greater than an amount of graphene flakes located in the crystalline regions of the ultrahigh molecular weight polyethylene polymer matrix.

20. The nanocomposite fiber of claim 18, wherein the nanocomposite fiber has a diameter within a range of from about 500 nm to about 100 μm.

* * * * *